Jan. 20, 1942.   A. F. KOPISCH   2,270,684
ELECTRIC CABLE FLY KILLER
Filed Nov. 12, 1940

Arthur F. Kopisch
INVENTOR
BY Victor J. Evans & Co.
ATTORNEYS

Patented Jan. 20, 1942

2,270,684

UNITED STATES PATENT OFFICE 2,270,684

ELECTRIC CABLE FLY KILLER

Arthur F. Kopisch, Blackwell, Okla.

Application November 12, 1940, Serial No. 365,387

1 Claim. (Cl. 43—112)

This invention relates to an electric cable fly killer and has for an object to provide an electric cable which may be arranged to hang downward in store windows, from ceilings, and other places and to be connected to a suitable source of electricity, the cable including two stranded wires insulated from each other, and pierced at short intervals by pegs of conducting material, whereby a fly or other insect bridging the space between the pegs will be electrocuted.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1:
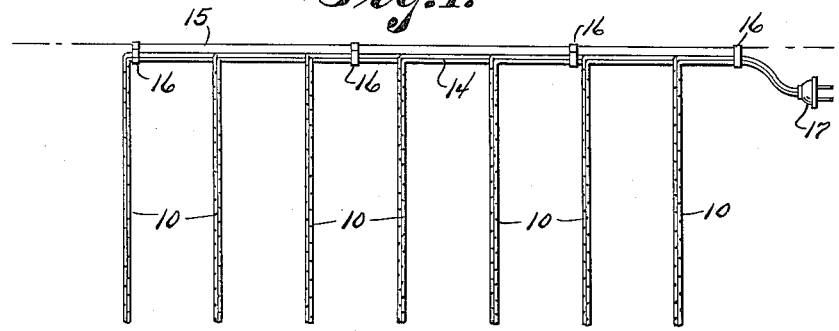
Figure 1 is a front elevation showing a plurality of electric cable fly killers constructed in accordance with the invention, in applied position and connected to a conductor for supplying electric current thereto.
Figure 2:
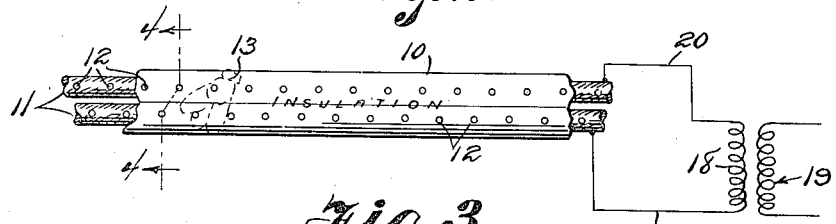
Figure 2 is a fragmentary front elevation of one of the electric cable fly killers showing diagrammatically a source of high tension current connected thereto.
Figure 3:
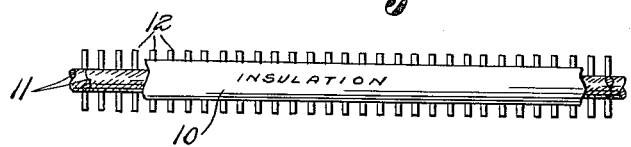
Figure 3 is an end elevation of the electric cable fly killer shown in Figure 2.
Figure 4:
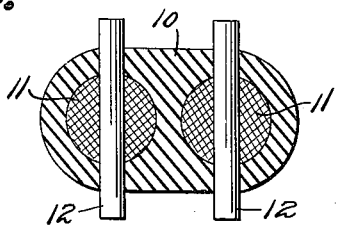
Figure 4 is an enlarged detail cross sectional view taken on the line 4—4 of Figure 2.

Referring now to the drawing in which like characters of reference designate similar parts in the various views, the electric cable fly killer comprises a cable 10 of insulating material containing two stranded electric circuit wires 11, the strands of the wires being pierced at short intervals by pegs 12 of conducting material which project from either side of the cable in alternate spaced relation whereby a fly 13 or other insect bridging the space between pegs of different polarity will be electrocuted.

The electric cable fly killers are preferably mounted to hang down vertically from any suitable support and are preferably connected at the upper ends to a current supplying cable 14 which may be secured for example to a ceiling 15 by staples 16 or other securing means. The current supplying cable is of conventional type embodying two wires insulated from each other and to which the stranded wires of the electric cable fly killers 10 are respectively secured. The current supplying cable 14 may be connected by a conventional plug 17 to a suitable outlet for 110 volt supply wires.

If desired, the electric cable fly killers 10 may be connected to the secondary winding 18 of a suitable transformer 19 by current conductor wires 20. The secondary high tension current will jump across the gaps between the pegs of the respective stranded wires 11 without injuring the insulation of the cable. The transformer may be continuously operated or intermittently operated as desired.

From the above description it is thought that the construction and operation of the invention will be fully understood without further explanation.

What is claimed is:

An electric cable fly killer comprising an insulated cable containing two stranded electric circuit wires, pegs of conducting material piercing the wires at short spaced intervals and projecting from either side of the cable in alternate spaced relation whereby a fly or other insect bridging the space between pegs of different polarity will be electrocuted.

ARTHUR F. KOPISCH.